(12) United States Patent
Tsunekawa et al.

(10) Patent No.: US 7,854,773 B2
(45) Date of Patent: Dec. 21, 2010

(54) METHOD OF PRODUCING AN ELECTRODE PLATE FOR A NONAQUEOUS ELECTROLYTE SECONDARY BATTERY

(75) Inventors: Masayuki Tsunekawa, Tokyo (JP); Tadafumi Shindo, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 322 days.

(21) Appl. No.: 12/002,596

(22) Filed: Dec. 18, 2007

(65) Prior Publication Data

US 2008/0113265 A1      May 15, 2008

Related U.S. Application Data

(63) Continuation of application No. 10/946,773, filed on Sep. 22, 2004, now abandoned.

(30) Foreign Application Priority Data

Sep. 30, 2003   (JP)   ............................... 2003-340464

(51) Int. Cl.
    *H01M 4/04*       (2006.01)
(52) U.S. Cl. .................... 29/623.1; 429/209; 83/875; 83/876
(58) Field of Classification Search ........................ None
    See application file for complete search history.

(56) References Cited

U.S. PATENT DOCUMENTS

| 6,444,357 B1 | 9/2002 | Kambe et al. | |
| 2003/0099878 A1* | 5/2003 | Kramlich et al. | 429/162 |

FOREIGN PATENT DOCUMENTS

| JP | 9-129223 A | 5/1997 |
| JP | 09-298057 | * 11/1997 |
| JP | A H09 298057 | 11/1997 |
| JP | 2000-173597 | 6/2000 |
| JP | 2001-176558 A | 6/2001 |

\* cited by examiner

*Primary Examiner*—Jennifer K Michener
*Assistant Examiner*—Tony Chuo
(74) *Attorney, Agent, or Firm*—Ladas & Parry LLP

(57)  ABSTRACT

There is disclosed an electrode plate for a nonaqueous electrolyte secondary battery, which comprises a collector and an active material layer provided on at least one side of the collector, in which the active material layer has one or more slits. Such an electrode plate can facilitate infiltration of a liquid electrolyte even when wound at high density and can have high stability of quality. There is also disclosed a nonaqueous electrolyte secondary battery with high capacity and high quality, which is constructed using the above-mentioned electrode plate.

5 Claims, 3 Drawing Sheets

METHOD OF PRODUCING AN ELECTRODE PLATE FOR A NONAQUEOUS ELECTROLYTE SECONDARY BATTERY

CROSS REFERENCE TO RELATED APPLICATIONS

The present application is a continuation application of U.S. Ser. No. 10/946,773, file Sep. 22, 2004 which is now abandoned.

BACKGROUND OF THE INVENTION

1. Field of the Invention

The present invention relates to an electrode plate for use in nonaqueous electrolyte secondary batteries typically including lithium-ion secondary batteries and to a nonaqueous electrolyte secondary battery using thereof.

2. Description of the Related Art

Recent years have seen rapid advances in miniaturization and weight reduction of electronic equipment and communication equipment. Thus, there has been a demand for miniaturization and weight reduction of secondary batteries for use as a driving power source in such equipment. For this purpose, in place of conventional alkaline storage batteries, there have been proposed nonaqueous electrolyte secondary batteries, typically lithium-ion secondary batteries, which can have a high energy density and a high voltage.

An electrode plate for use as a positive electrode of the nonaqueous electrolyte secondary battery (a positive electrode plate) is produced by using a complex oxide such as lithium manganate and lithium cobaltate as a positive active material, dispersing or dissolving the positive active material, an electrically-conductive material and a binder in an appropriate wetting agent (solvent) to prepare a slurry-like coating composition, and applying the coating composition onto a collector made of metal foil so that a positive active material layer is formed thereon.

On the other hand, an electrode plate for use as a negative electrode of the nonaqueous electrolyte secondary battery (a negative electrode plate) is produced by using a carbonaceous material such as carbon capable of occluding cation (such as lithium ion) as a negative active material, in which the cation is released from the positive active material at the time of charging, dispersing or dissolving the negative active material and a binder in an appropriate wetting agent (solvent) to prepare a slurry-like coating composition, and applying the coating composition onto a collector made of metal foil so that a negative active material layer is formed thereon.

A terminal for taking out electric current is then attached to each of the positive and negative electrode plates, both of which are then wound up with a separator (for preventing short circuit) sandwiched therebetween and sealed in a container filled with a nonaqueous electrolyte solution, so that a secondary battery is constructed.

In recent years, there has also been a demand for a nonaqueous electrolyte secondary battery with higher capacity, and various improvements have been made. An example of such improvements is to tightly wind the electrode plates for the purpose of increasing the amount of the active material to be stored in the limited volume, namely, a method of increasing the winding density of the electrode plates. However, an increased winding density can lead to a reduction in voids for infiltration of the liquid electrolyte, so that the liquid electrolyte can less infiltrate into the active material layer. Such reduced infiltration of the liquid electrolyte can lead to poor battery performance, even if the winding density of the electrode plate is increased for the purpose of increasing the capacity.

Japanese Patent Application Laid-Open (JP-A) No. 09-129223 discloses a method of ensuring paths for a liquid electrolyte by embossing the active material layer. In such a method, however, a load can locally be applied to projection portions of the embossed material, when the electrode plates are wound up. Thus, such a method can cause a rupture of the electrode due to expansion and contraction of the volume during charge and discharge cycles and has a problem with stability of quality.

SUMMARY OF THE INVENTION

The present invention has been made in view of the above circumstances. It is therefore a first object of the invention to provide an electrode plate for nonaqueous electrolyte secondary battery which can facilitate infiltration of a liquid electrolyte even when wound at high density and can have high stability of quality.

It is a second object of the invention to provide a nonaqueous electrolyte secondary battery with high capacity and high quality constructed using the above-mentioned electrode plate.

The present invention is directed to an electrode plate for a nonaqueous electrolyte secondary battery, which comprises a collector and an active material layer provided on one side or both sides of the collector, in which the active material layer has a slit or slits.

In the electrode plate for a nonaqueous electrolyte secondary battery of the present invention, the active material layer has a slit or slits. Such a slit functions as a path for a liquid electrolyte, when the electrode plates are closely laminated to each other. Such a slit can also increase the surface area of the active material layer. Even when electrode plates wound at a high density are placed in a battery case, the liquid electrolyte can easily infiltrate into the active material layer so that charges can rapidly move between the electrodes and that a high voltage or a high current can be produced. In addition, the active material layer has no projection portion and thus can be free from a locally applied load. Therefore, the electrode can be prevented from being ruptured by expansion and contraction of the volume during charge and discharge cycles and can exhibit high stability of quality.

In another aspect, the invention is directed to a nonaqueous electrolyte secondary battery, comprising the above electrode plate for a nonaqueous electrolyte secondary battery according to the present invention. In this secondary battery, the winding density of the electrode plate can be increased for the purpose of increasing the capacity, because the electrode plates packed inside can facilitate infiltration of a liquid electrolyte even when wound at high density and can have high stability of quality. Therefore, in this secondary battery a larger amount of the active material can be stored in the limited volume, so that the battery can stably offer high capacity and high quality performance for a long time.

Figure 1:
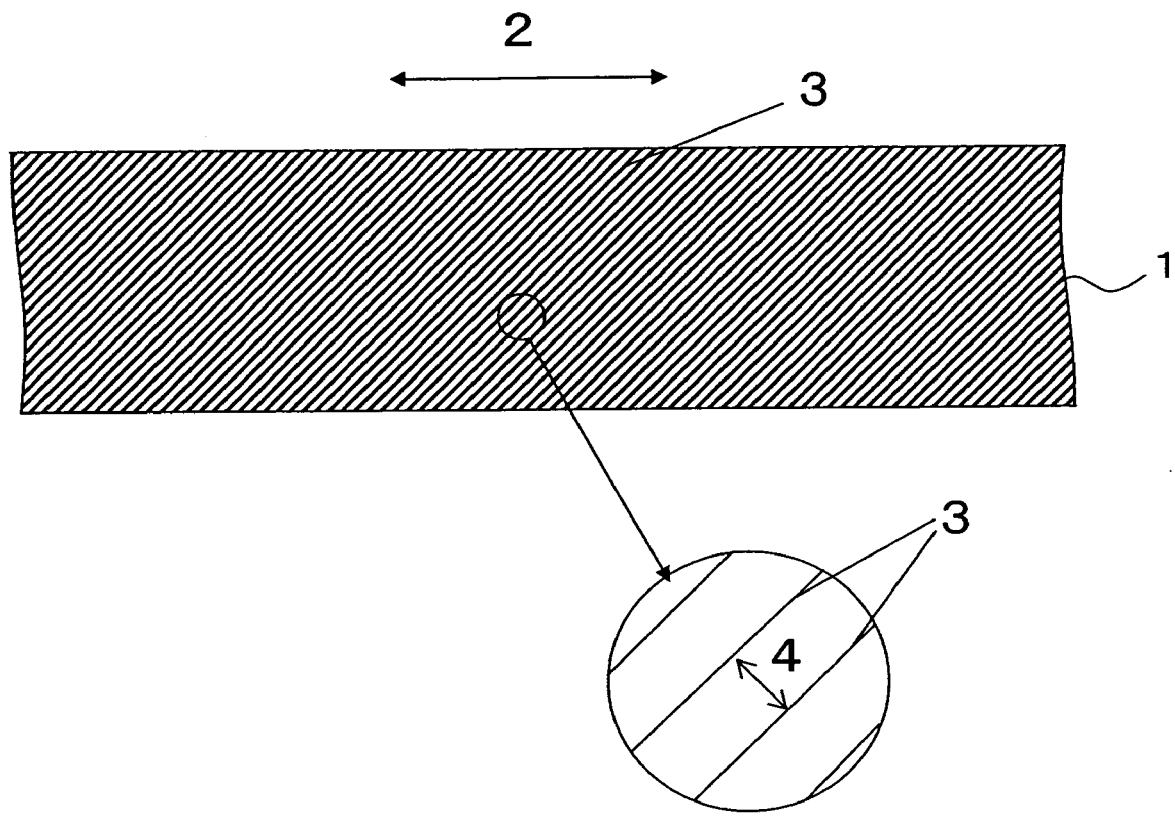
FIG. 1 is a diagram schematically showing an example of the slits in the active material layer according to the present invention.

Additionally, symbols in the figures respectively represent the following meaning:
1 active material layer
2 winding direction of electrode plate
3 slit
4 distance between adjacent slits
5 rotary die unit
6 blade

DETAILED DESCRIPTION OF THE PREFERRED EMBODIMENTS

The electrode plate for a nonaqueous electrolyte secondary battery according to the present invention comprises a collector and an active material layer formed on at least one side of the collector and is such that the active material layer has one or more slits.

The electrode plate for a nonaqueous electrolyte secondary battery according to the invention may be any of a positive electrode plate and a negative electrode plate. The positive electrode plate may be produced by applying a positive active material layer coating composition, which contains at least a positive active material and a binder, onto one side or both sides of a corrector, so as to form a positive active material layer. The negative electrode plate may be produced by applying a negative active material layer coating composition, which contains at least a negative active material and a binder, onto one side or both sides of a corrector, so as to form a negative active material layer.

The positive active material may be any conventional positive active material for nonaqueous electrolyte secondary batteries. Examples of such materials include lithium oxides such as $LiMn_2O_4$ (lithium manganate), $LiCoO_2$ (lithium cobaltate) and $LiNiO_2$ (lithium nickelate); and chalcogen compounds such as $TiS_2$, $MnO_2$, $MoO_3$, and $V_2O_5$.

The positive active material is preferably in the form of a powder having a particle diameter of 1 to 100 μm and an average particle diameter of about 10 μm, in order that it can be uniformly dispersed in a coating layer. One or more of these positive active materials may be used alone or in combination.

The negative active material may be any conventional negative active material for nonaqueous electrolyte secondary batteries. Preferred examples of such materials include carbonaceous materials such as natural graphite, artificial graphite, amorphous graphite, carbon black, materials wherein a different element is added to any one of these materials; and lithium-containing metal materials such as lithium metal and lithium alloys.

The granular shape of the negative electrode-active material is not particularly limited. Examples thereof include scaly, lump, fibrous, and spherical shapes. The negative active material is preferably in the form of a powder having a particle diameter of 1 to 100 μm and an average particle diameter of about 10 μm, in order that it can be uniformly dispersed in a coating layer. One or more of these negative active materials may be used alone or in combination.

In particular, a lithium secondary battery having a high discharge voltage of about 4 V can be obtained using $LiCoO_2$ and the carbonaceous material as the positive and negative active materials, respectively.

Based on the amount of the components other than the solvent (based on the amount of the solid components), the content of the positive or negative active material in the coating composition is generally from 90 to 98.5% by weight, preferably from 93 to 98.5% by weight, more preferably from 96 to 98.5% by weight, in terms of achieving high capacity.

The binder may be any conventional binder, for example, including thermoplastic resins. Specific examples of the applicable binder include polyester resins, polyamide resins, polyacrylic ester resins, polycarbonate resins, polyurethane resins, cellulose resins, polyolefin resins, polyvinyl resins, fluorocarbon resins, and polyimide resins. In this case, an acrylate monomer or oligomer having an introduced reactive functional group can be blended into the binder. Other examples of the applicable binder include rubber-based resins, thermosetting resins such as acrylic resins and urethane resins, ionizing radiation-curable resins comprising of an acrylate monomer, an acrylate oligomer or a mixture thereof, and mixtures of the above described various resins.

Based on the amount of the solid components, the content of the binder in the coating composition is generally from 0.5 to 10% by weight, preferably from 1 to 5% by weight or preferably from 1.5 to 3% by weight in terms of achieving high capacity.

The positive or negative active material layer coating composition may also contain an electrically conductive agent. For example, a carbonaceous material such as graphite, carbon black or acetylene black is optionally used as the electrically conductive agent. Based on the amount of the solid components, the content of the electrically conductive agent in the coating composition is generally from 1 to 3% by weight.

The solvent for use in preparation of the positive or negative active material layer coating composition may be an organic solvent such as toluene, methyl ethyl ketone, N-methyl-2-pyrrolidone, or any mixture thereof; or water. The content of the solvent in the coating composition is generally from 10 to 60% by weight, so that the coating liquid can be prepared in the form of a slurry.

The positive or negative active material layer coating composition may be prepared in the form of a slurry by adding an appropriately selected positive or negative active material, a binder and any other component to an appropriate solvent, and mixing and dispersing them in a dispersing machine such as a homogenizer, a ball mill, a sand mill, a roll mill, and a planetary mixer.

The positive or negative active material layer coating composition prepared as described above is applied to one side or both sides of a collector, which is a base material, and dried to form a positive or negative active material layer. In general, an aluminum foil is preferably used as a collector for the positive electrode plate. A copper foil such as an electrolytic copper foil and a rolled copper foil is preferably used as a collector for the negative electrode plate. The collector generally has a thickness of about 5 to about 50 μm.

Any coating method may be used to apply the positive or negative active material layer coating composition. A coating method capable of forming a thick coating layer is suitable, such as slide die coating, slit die coating, comma direct coating, and comma reverse coating. When a relatively thin active material layer is required, gravure coating, gravure reverse coating or the like may be used in the application process. The active material layer may be formed by repeating application and drying more than once.

In the drying process, the heat source may be hot air, infrared radiation, microwave, high-frequency wave, or any combination thereof. In the drying process, heat may be released from a heated metal roller or sheet for supporting or pressing the collector and used for drying. By radiating electron beams or radioactive rays after the drying, the binders are caused to crosslink-react so that the active material layer can be obtained. Application and drying may be repeated more than once.

In addition, the resulting positive or negative active material layer may be pressed so that the active material layer can have a higher density or improved homogeneity or exhibit increased adhesion to the collector.

For example, the press working is performed using a metal roll, an elastic roll, a heating roll, a sheet pressing machine, or the like. In the present invention, the press-working may be performed at room temperature or raised temperature as far as the press temperature is lower than the temperature for drying the coating layer of the active material layer. The press-working is usually performed at room temperature (typically ranging from 15 to 35° C.).

Roll press is preferred, because it allows continuous press working of a long sheet-shaped negative electrode plate. The roll press may be static press or constant pressure press. The line speed of the press is generally from 5 to 50 m/min. When the pressure of the roll-press is controlled by line pressure, the line pressure, which is adjusted dependently on the diameter of the pressing roll, is usually set to 0.5 kgf/cm to 2 tf/cm.

When sheet pressing is performed, the pressure is generally controlled in the range from 4903 to 73550 N/cm$^2$ (500 to 7500 kgf/cm$^2$), preferably in the range from 29420 to 49033 N/cm$^2$ (3000 to 5000 kgf/cm$^2$). If the pressing pressure is too low, the active material layer can be less homogeneous. If the pressing pressure is too high, the electrode plate itself including the collector can be broken. The active material layer may be pressed once so as to have the desired thickness or may be pressed several times for the purpose of improving the homogeneity.

The coating amount of the positive or negative active material layer is generally from 100 to 400 g/m$^2$. The thickness of the coating is generally set in the range from 50 to 200 μm after the drying and pressing processes. The density of the negative active material layer may be about 1.0 g/cc after the coating process but can be increased to at least 1.5 g/cc (generally about 1.5 to 1.75 g/cc) after the pressing process. When the press working is performed without any trouble so as to improve the volume energy density, a high capacity battery can be produced.

The resulting active material layer of the electrode plate contains at least the positive or negative active material and the binder and optionally the electrically conductive agent and/or any other component. After the drying process, the content of each component in the active material layer may be the same as the above content based on the amount of the solid components of the active material layer coating composition.

According to the present invention, one or more slits are formed in the resulting active material layer. Thus, even when the electrode plates are wound at high density, there is no projection portion so that a locally applied load can be avoided, and the electrolyte can easily infiltrate into the active material layer.

Figure 2:
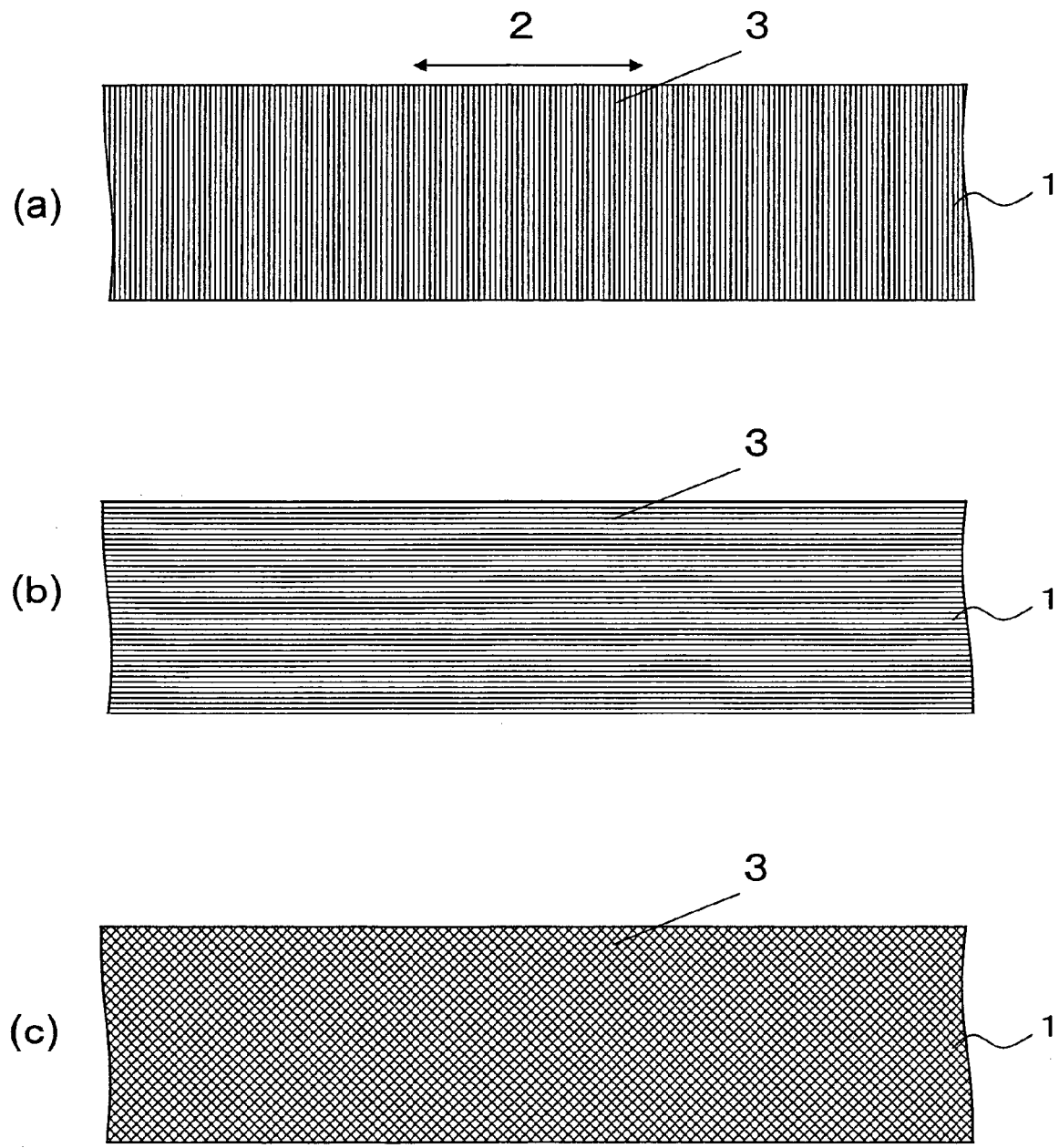
FIG. 2 is a diagram schematically showing other examples of the slits in the active material layer according to the present invention.
Figure 3:
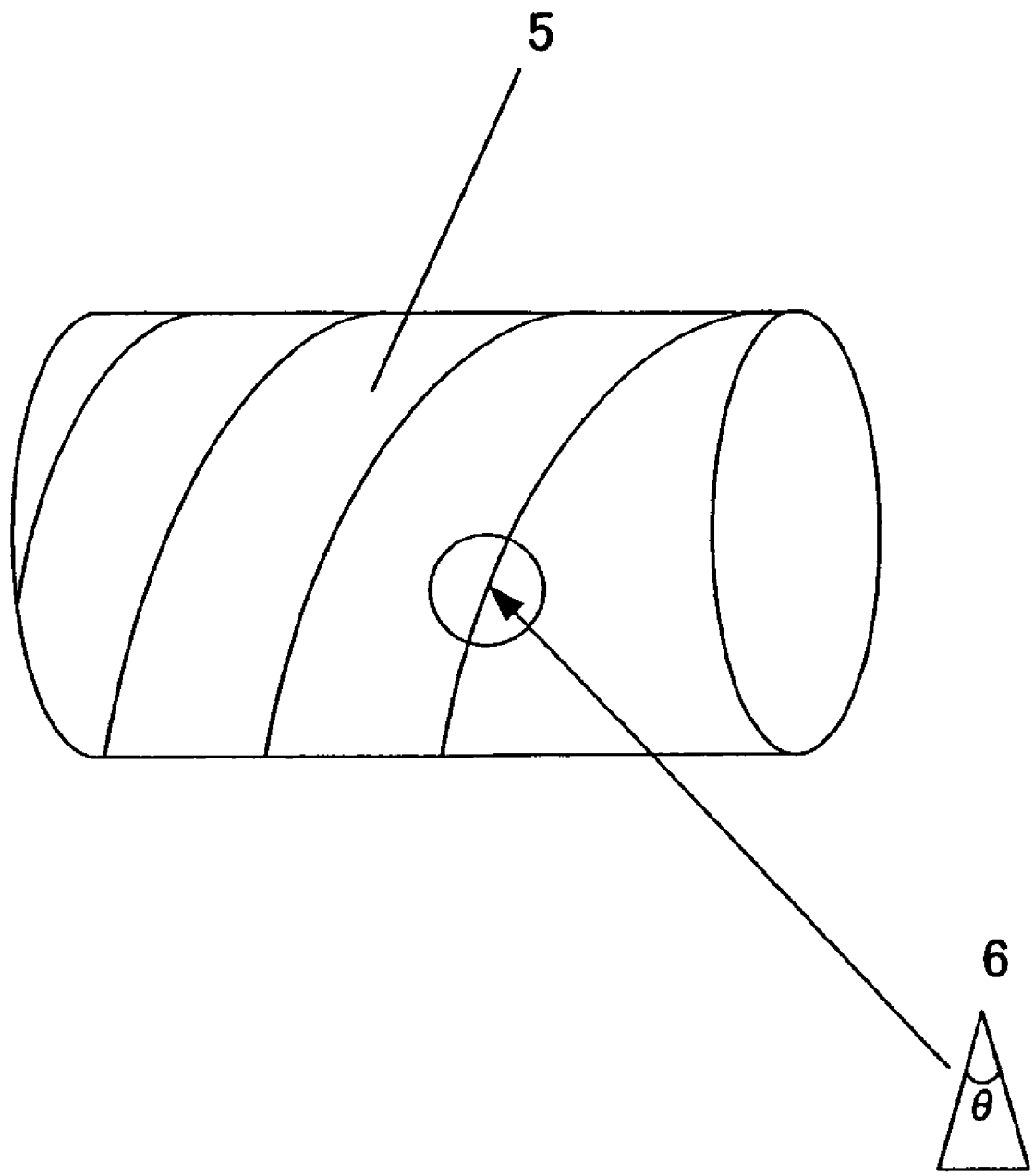
FIG. 3 is a diagram schematically showing a rotary die unit, which is an example of the means for forming slits in the active material layer according to the present invention.

The slit or slits of the positive or negative active material layer may be formed in any pattern. For example, as shown in the FIG. 1, the slits 3 may be formed in the form of lines inclined against the winding direction 2 of the electrode plate in the active material layer 1. For other examples, as shown in the FIG. 2, the slits may be formed perpendicular (FIG. 2 (a)) or parallel (FIG. 2 (b)) to the winding direction 2 of the electrode plate or formed by the intersection of lines (FIG. 2 (c)) inclined against the winding direction 2 of the electrode plate in the active material layer 1. The slit or slits may also be formed in a curved pattern. For example, the slit or slits may be formed using a rotary die unit as shown in FIG. 3 or the like. It should be noted that the collector serving as a substrate for the active material layer should not be damaged when the slit or slits are formed in the active material layer.

In terms of infiltration, the depth of the slit is preferably about 5 μm or more, more preferably about 8 μm or more, particularly preferably about 10 μm or more. In terms of infiltration, the width of the slit is preferably about 10 μm or more, more preferably from about 10 to about 50 μm, particularly preferably from about 15 to about 40 μm.

A too wide spacing between the slits cannot improve the infiltration of the electrolyte, while a too narrow spacing between the slits can make the active material layer brittle. Thus, the distance 4 between the adjacent slits is preferably from about 0.1 to about 10 mm, more preferably from about 1 to about 10 mm, particularly preferably from about 2 to about 5 mm.

According to the above description, the inventive electrode plate for nonaqueous electrolyte secondary batteries can be obtained, and nonaqueous electrolyte secondary batteries are produced using the present electrode plate.

The nonaqueous electrolyte secondary battery of the present invention comprises a positive electrode plate and a negative electrode plate, in which at least one of the positive and negative plates comprises the electrode plate for a nonaqueous electrolyte secondary battery of the present invention; preferably, both positive and negative plates comprise the electrode plate for a nonaqueous electrolyte secondary battery of the present invention.

The electrode plate for a nonaqueous electrolyte secondary battery according to the present invention is used as at least one of the positive and negative electrode plates, which are wound into a swirl form with a separator such as a porous polyethylene film interposed therebetween and inserted into a packing container. After the insertion, a lead is connected between a terminal connection part of the positive electrode plate (an exposed surface of the collector) and a positive terminal provided on the upper surface of the packing container, while another lead is connected between a terminal connection part of the negative electrode plate (another exposed surface of the collector) and a negative terminal provided on the bottom surface of the packing container. The packing container is then filled with a liquid nonaqueous electrolyte and sealed so that a nonaqueous electrolyte secondary battery comprising the electrode plate according to the present invention is completed.

In this secondary battery, the winding density of the electrode plate can be increased for the purpose of increasing the capacity, because the electrode plates packed inside can facilitate infiltration of a liquid electrolyte even when wound at high density and can have high stability of quality. Therefore, in this secondary battery a larger amount of the active material can be stored in the limited volume, so that the battery can stably offer high capacity and high quality performance for a long time.

When a lithium secondary battery is produced, a solution of a lithium salt (which is a solute) in an organic solvent is used as the liquid nonaqueous electrolyte. The lithium salt may be an inorganic lithium salt such as $LiClO_4$, $LiBF_4$, $LiPF_6$, $LiAsF_6$, LiCl, and LiBr; or an organic lithium salt such as LiB $(C_6H_5)_4$, $LiN(SO_2CF_3)_2$, $LiC(SO_2CF_3)_3$, $LiOSO_2CF_3$, $LiOSO_2C_2F_5$, $LiOSO_2C_3F_7$, $LiOSO_2C_4F_9$, $LiOSO_2C_5F_{11}$, $LiOSO_2C_6F_{13}$, and $LiOSO_2C_7F_{15}$.

Examples of the organic solvent for use in dissolving the lithium salt include cyclic esters, chain esters, cyclic ethers, and chain ethers. Specific examples of the cyclic esters include ethylene carbonate, propylene carbonate, butylene carbonate, γ-butyrolactone, vinylene carbonate, 2-methyl-γ-butyrolactone, acetyl-γ-butyrolactone, and γ-valerolactone.

Examples of the chain esters include dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionate, dialkyl malonate, and alkyl acetate.

Examples of the cyclic ethers include tetrahydrofuran, alkyltetrahydrofuran, dialkyltetrahydrofuran, alkoxytetrahydrofuran, dialkoxytetrahydrofuran, 1,3-dioxolane, alkyl-1,3-dioxolane, and 1,4-dioxolane.

Examples of the chain ethers include 1,2-dimethoxyethane, 1,2-diethoxyethane, diethyl ether, ethylene glycol dialkyl ether, diethylene glycol dialkyl ether, triethylene glycol dialkyl ether, and tetraethylene glycol dialkyl ether.

As described above, in the electrode plate for a nonaqueous electrolyte secondary battery according to the present invention, the slit or slits of the active material layer ensure a path or paths for a liquid electrolyte even at high winding density and can increase the surface area of the active material layer. Even when electrode plates wound at high density are placed in a battery case, the liquid electrolyte can easily infiltrate into the active material layer so that charges can rapidly move between the electrodes and that a high voltage or a high current can be produced. In addition, the active material layer has no projection portion and thus can be free from a locally applied load. Therefore, the electrode can be prevented from being ruptured by expansion and contraction of the volume during charge and discharge cycles and can exhibit high stability of quality. Thus, the electrode plate for a nonaqueous electrolyte secondary battery of the invention can suppress the production of defectives and can achieve high capacity and high quality.

In addition, in the nonaqueous electrolyte secondary battery according to the present invention, the winding density of the electrode plate can be increased for the purpose of increasing the capacity, because the electrode plates packed inside can facilitate infiltration of a liquid electrolyte even when wound at high density and can have high stability of quality. Therefore, in this secondary battery a larger amount of the active material can be stored in the limited volume, so that the battery can stably offer high capacity and high quality performance for a long time.

EXAMPLES

Example 1

A positive active material layer coating composition was prepared by dispersing and mixing 100 parts by weight of $LiCoO_2$ (positive active material), 2.5 parts by weight of acetylene black (electrically conductive agent for positive electrode), 2 parts by weight of polyvinylidene fluoride (binder for positive electrode), and 45 parts by weight of N-methylpyrrolidone (solvent) in a planetary disperser. The positive active material layer coating composition was applied to both sides of a 15 µm thick aluminum foil so as to have a dry coating amount of about 250 g/m² per one side. Thereafter, the coating was dried and pressed so that a positive electrode plate with a coating film density of 3.7 g/cc was obtained. Slits were then formed in the positive electrode plate through a rotary die unit. The slits were formed with a depth of 10 µm, a width of 10 µm. And a distance between the adjacent slits was 5 mm. The positive electrode plate was cut so as to have a width of 56 mm.

On the other hand, a negative active material layer coating composition was prepared by dispersing and mixing 100 parts by weight of graphite (negative active material), 5 parts by weight of polyvinylidene fluoride (binder for negative electrode), and 70 parts by weight of N-methylpyrrolidone (solvent) in a planetary disperser. The negative active material layer coating composition was applied to both sides of a 10 µm thick copper foil so as to have a dry coating amount of about 100 g/m² per one side. Thereafter, the coating was dried and pressed so that a negative electrode plate was obtained.

The resulting positive and negative electrode plates were tightly wound with a separator interposed therebetween to be inserted into a packing container. And, as electrolyte, a solution of 1 M $LiPF_6$ in ethylene carbonate/methyl ethyl carbonate (1/1) was injected thereto.

Example 2

The process of Example 1 was performed except that through the rotary die unit, the slits was formed with a depth of 20 µm, a width of 20 µm and a distance between the adjacent slits of 5 mm in the positive electrode for use, after the press.

Example 3

The process of Example 1 was performed except that through the rotary die unit, the slits was formed with a depth of 3 µm, a width of 5 µm and a distance between the adjacent slits of 5 mm in the positive electrode for use, after the press.

Comparative Example 1

The process of Example 1 was performed except that no slit was formed in the positive electrode plate for use, after the press.

(Results of Evaluation)

The electrode plate obtained in each of Examples and Comparative Example was evaluated in terms of infiltration of the liquid electrolyte as shown below. In each of Examples 1 to 3 with the electrode plate of the present invention, the active material layer of the electrode plate had slits according to the present invention, and thus the electrode plate was able to be wound without any locally applied force. In addition, the liquid electrolyte easily-infiltrated, even when the electrodes were wound at high density. In Examples 1 and 2 with a slit depth of at least 5 µm, infiltration characteristic of the electrolyte was particularly good. In Comparative Example 1 with no the electrode plate of the invention, the active material layer of the electrode plate had no slit, and thus infiltration characteristic of the electrolyte was poor, when the electrode was wound at the same density as in each of Examples.

The invention claimed is:

1. A method of producing an electrode plate for a nonaqueous electrolyte secondary battery comprising a step of forming slits having a width of from 10 µm to 50 µm through a rotary die unit on an active material layer of the electrode plate comprising a collector and the active material layer provided on one side or both sides of the collector.

2. The method of producing an electrode plate for a nonaqueous electrolyte secondary battery according to claim 1, wherein the depth of the slits is from 5 µm to 20 µm.

3. The method of producing an electrode plate for a nonaqueous electrolyte secondary battery according to claim 1, wherein a distance between the adjacent slits is from 1 mm to 10 mm.

4. The method of producing an electrode plate for a nonaqueous electrolyte secondary battery according to claim 1, wherein the slits are formed on a positive active material layer.

5. The method of producing an electrode plate for a nonaqueous electrolyte secondary battery according to claim 1, wherein the slits are in the form of lines inclined against a winding direction of the electrode plate.

* * * * *